United States Patent [19]
Alf et al.

[11] 3,922,010
[45] Nov. 25, 1975

[54] PIVOTABLE INTAKE TUBE FOR AIR FILTERS OF INTERNAL COMBUSTION ENGINES

[75] Inventors: Herbert Alf, Ludwigsburg; Bernhard Behrendt, Abstatt, both of Germany

[73] Assignee: Filterwerk Mann & Hummel GmbH, Ludwigsburg, Germany

[22] Filed: Oct. 26, 1973

[21] Appl. No.: 409,913

[30] Foreign Application Priority Data
Oct. 27, 1972  Germany............................ 7239451

[52] U.S. Cl. ................ 285/179; 285/184; 285/282; 285/404
[51] Int. Cl.² .......................................... F16L 27/00
[58] Field of Search ........... 285/184, 276, 277, 305, 285/404, DIG. 22, 319, 179, 82, 88, 87, 282, DIG. 4; 85/5 R; 403/93, 117, 106

[56] References Cited
UNITED STATES PATENTS

| | | |
|---|---|---|
| 658,755 | 10/1900 | Bowes................................ 285/88 |
| 832,757 | 10/1906 | Stirzaker............................. 285/87 |
| 951,889 | 3/1910 | Teuer.................................. 285/319 |
| 1,366,634 | 1/1921 | Clark .................................. 285/276 |
| 1,486,287 | 3/1924 | Field .................................... 403/93 |
| 2,081,571 | 5/1937 | Baade ................................. 285/277 |
| 2,587,938 | 3/1952 | Warren............................... 285/184 |
| 3,199,187 | 8/1965 | Lyday et al. ......................... 85/5 R |
| 3,239,244 | 3/1966 | Leinfelt............................ 285/276 X |

FOREIGN PATENTS OR APPLICATIONS

| | | | |
|---|---|---|---|
| 1,189,808 | 4/1970 | United Kingdom.................. 285/184 |
| 214,959 | 9/1924 | United Kingdom.................. 285/87 |

*Primary Examiner*—Thomas J. Callaghan
*Attorney, Agent, or Firm*—Joseph A. Geiger

[57] ABSTRACT

A pivotable intake tube for air filters of internal combustion engines having a rotary tube connection between a fixed tube section and an elbow tube comprising male-female bearing portions, an annular groove in the male bearing portion, and two connecting blocks snapped into the female bearing portion so as to engage the groove.

7 Claims, 4 Drawing Figures

PIVOTABLE INTAKE TUBE FOR AIR FILTERS OF INTERNAL COMBUSTION ENGINES

BACKGROUND OF THE INVENTION

1. Field of the Invention

The present invention relates to an intake tube for air filters of internal combustion engines comprising a tube section of plastic which is rigidly connected to the filter housing and a elbow tube section, likewise of plastic, which is pivotable around the tube axis between two limiting positions.

2. Description of the Prior Art

In a known version of this type the near end of the pivotable elbow tube is provided with a radially protruding annular bead which engages a matching groove in the cooperating tube section. The groove flank facing toward the elbow tube consists of four flank sections which are regularly spaced around the periphery of the groove, recesses exposing the full depth of the groove being provided between these flank sections.

It was found that the production of these parts requires expensive injection molding tools which are prone to malfunction, because the formation of the groove in the tube section involves the production of an undercut behind the remaining flank sections of the groove. In addition, the snap connection between the tube section and the elbow tube requires comparatively narrow manufacturing tolerances which reflect themselves in high production costs.

SUMMARY OF THE INVENTION

The objective of the present invention consists in suggesting an intake tube in which the above-mentioned shortcomings are avoided and in which a pivotable connection between the elbow tube and the tube section is obtained which simplifies production and assembly and is also reliable in its operation.

According to the present invention, this objective is attained by providing at least two connecting blocks of plastic in regular spacing on the periphery of the tube section and retaining them laterally inside openings in the wall of the latter so as to prevent them from falling out, the connecting blocks having guide portions extending radially inwardly into an annular groove which is provided in the elbow tube.

The tools may now have coarser tolerances and can be of a simplified design, because the previously required undercut on the tube section which extends from the filter housing is no longer necessary. Removal of the molded tube section from the molding die is likewise simplified, so that savings in production can be realized.

In a preferred embodiment of the invention, the connecting blocks are prevented from falling out of their wall openings by a simple retaining means constituted by retaining noses on the connecting blocks which engage the tube section wall from the inside.

The elbow tube is preferably also provided with a flexible positioning lever extending substantially parallel to the rotational axis, the lever being arranged to engage positioning notches on the periphery of the tube section, when the elbow tube is in one of its end positions.

BRIEF DESCRIPTION OF THE DRAWING

Further special features and advantages of the invention will become apparent from the following description of a preferred embodiment illustrated in the drawing and from the claims. The preferred embodiment is illustrated in the drawing as follows:

DESCRIPTION OF THE PREFERRED EMBODIMENTI

Figure 1:
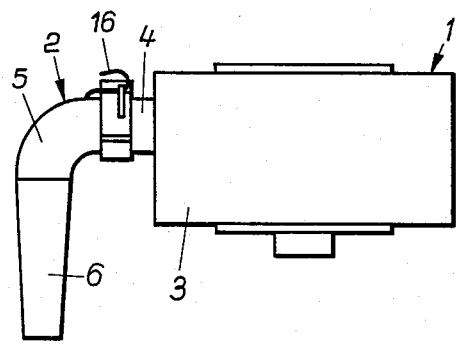
FIG. 1 shows in an elevational side view an air intake filter with a pivotable intake tube embodying the invention.

The air filter 1 is provided with an air intake tube 2 which is composed of a tube section 4 fixedly attached to the filter housing 3 and an elbow tube 5 which is pivotable around the tube axis.

Both the tube section 4 and the elbow tube 5 are of plastic material. In the embodiment shown the elbow tube 5 includes a metallic tube section 6 which is permanently joined to the entry side of the elbow.

Figure 2:
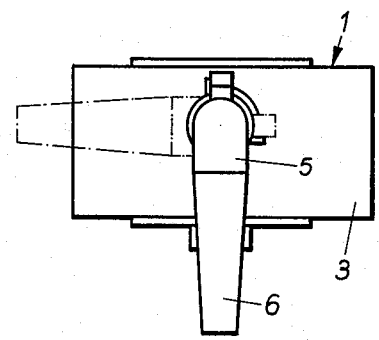
FIG. 2 shows the arrangement of FIG. 1 in an elevational side view.

As can be seen from FIG. 2, the air intake tube 2 can be moved into a first end position, indicated by dotted lines, which corresponds to the summer position in which the intake opening points to a cool air region. It can also be moved into a vertical end position, corresponding to the winter position, in which the intake opening is oriented closer to the hot exhaust manifold (not shown).

Figure 4:
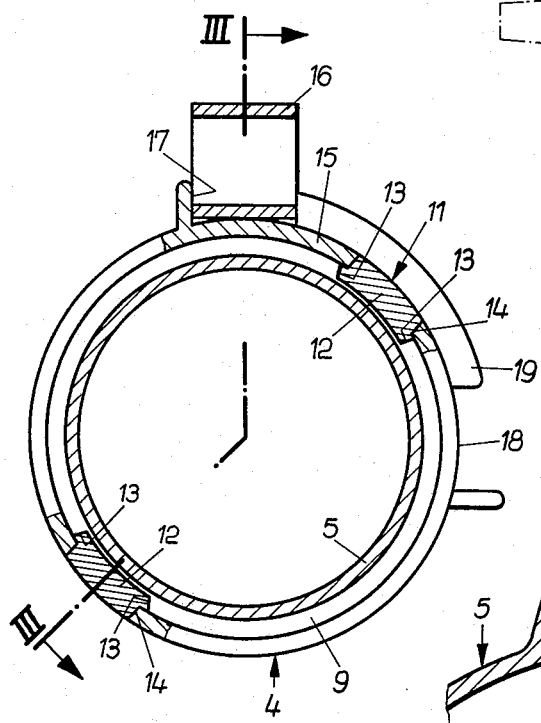
FIG. 4 shows the intake tube of the invention, partially cross-sectioned along line IV—IV of FIG. 3, and partially in a side view.
Figure 3:
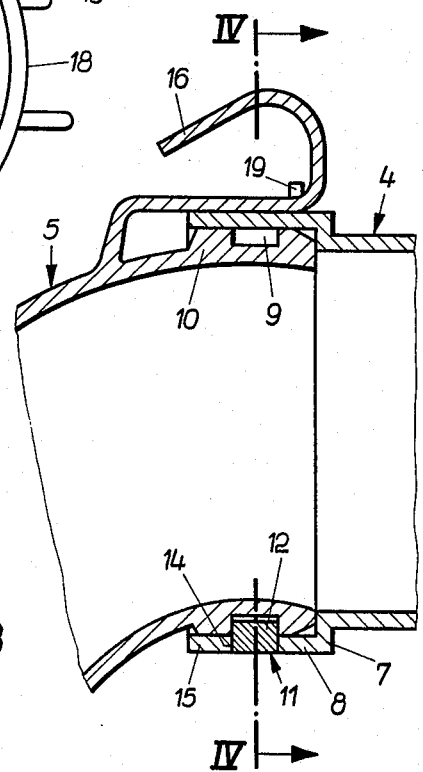
FIG. 3 shows a longitudinal cross section through the intake tube of the invention taken along line III—III of FIG. 4.

Details of the connection between the elbow tube 5 and the tube section 4 are illustrated in FIGS. 3 and 4. The tube section 4, on its end pointing away from the filter housing 3, has an enlarged cylindrical end portion 8 with a corresponding interior recess which accomodates a likewise enlarged end portion 10 of the elbow tube 5. This enlarged end portion 10 is provided with an annular groove 9. Two connecting blocks 11 of plastic material are arranged inside openings 14 in the wall 15 of the tube section 4, the openings being spaced regularly on the periphery of the tube section. The connecting blocks include radially inwardly protruding guide portions 12 and retaining noses 13 and are inserted into the wall openings 14 from the outside. After insertion, the connecting blocks 11 are laterally retained by the openings 14 and radially retained by their retaining noses 13 which engage the inside of wall 15 of the tube section 4. This arrangement prevents the connecting blocks 11 from falling out. With their guide portions 12 the connecting blocks engage the annular groove 9 of the elbow tube 5, thus constituting a pivotable connection between the elbow tube 5 and the tube section 4 which is extremely simple to assemble and very reliable in operation.

The elbow tube 5 further includes a positioning lever 16 which extends substantially parallel to its axis. One end of the positioning lever 16 is connected to the elbow tube 5, while its free end is folded back by approximately 210° to form an outwardly curving handle.

The tube section 4, on its outer periphery, is provided with cooperating positioning notches 17 and 18, capable of receiving the positioning lever 16 of the elbow tube 5. Between the notches 17 and 18 is arranged a slide ledge for the positioning lever 16. In order to reposition the elbow tube 5 from one end position into another, the positioning lever 16 is pulled out of the corresponding positioning notch, e.g. notch 17. During pivoting, the lever 16 slides over the slide ledge 19, engaging the other positioning notch, e.g. notch 18, automatically, as soon as the desired position is reached. The elbow tube 5 is now firmly positioned in the other end position.

It should be understood, of course, that the foregoing disclosure describes only a preferred embodiment of the invention and that it is intended to cover all changes and modifications of this example of the invention which fall within the scope of the appended claims.

We claim:

1. In a pivotable intake tube for the air filter of an internal combustion engine, a rotary tube connection comprising in combination:
    a first tube end portion having a substantially cylindrical female bearing portion;
    a second tube end portion having a substantially cylindrical male bearing portion cooperating with said female bearing portion so as to be rotatably guided therein;
    an annular groove in said male bearing portion and at least one cooperating connecting block in said female bearing portion for axially locking said first and second tube end portions in rotatable engagement with one another;
    two radially open positioning notches arranged on one of the two tube end portions, at an angular spacing of approximately 90°, said notches having substantially parallel radially extending locking flanks, the notches being part of a radial collar of the tube end portion, and the collar portion between the notches defining a slide ledge;
    a positioning lever fixedly attached by one of its extremities to the other tube end portion, said lever having a resiliently bendable lever portion extending axially toward said collar with the positioning notches, with a bias in the direction of engagement with one of said notches, said lever portion having two substantially parallel opposite locking faces engageable with the locking flanks of said notches, such engagement providing a rotational locking action between the tube end portions; the positioning lever being bendable, against said bias, out of engagement with a notch and slideable on said slide ledge; and
    two oppositely facing abutment shoulders arranged radially above the more distant flanks of the two positioning notches, said shoulders abuting the positioning lever in alignment with a notch, thereby limiting the angular mobility of the positioning lever to said 90° angular spacing.

2. A tube connection as defined in claim 1, wherein:
    the first tube end portion is stationary and part of an intake tube section connected to the air filter, and said positioning notches are a part of this first tube end portion; and
    the second tube end portion is part of an injection-molded elbow tube, and said positioning lever is a part of this elbow tube.

3. A tube connection as defined in claim 2, wherein the positioning lever is injection-molded as an integral part of the elbow tube, being resiliently bendable by virtue of the resiliency of the plastic material.

4. A tube connection as defined in claim 3, wherein the integral positioning lever has a generally flat rectangular cross section limiting its bendability to the radial direction, which is in and out of said positioning notch or notches, the bendable portion of the lever being folded back toward the attached end, so as to constitute a loop-type lifting handle.

5. A tube connection as defined in claim 1, wherein:
    the two tube end portions are constituted by injection-molded plastic parts, at least one of the former having a radially deformable wall;
    the connecting blocks are two in number and located diametrically opposite one another, being seated fixedly in the female bearing portion;
    each connecting block includes enlarged nose portions on its radially inwardly extending portion, which nose portions retain the block in position against an outwardly directed force; and
    the male bearing portion of the second tube end portion has an end taper on its outer diameter.

6. A tube connection as defined in claim 1, wherein:
    the first tube end portion includes an axial shoulder adjacent its female bearing portion;
    the second tube end portion has an end face cooperating with said shoulder.

7. In a pivotable intake tube for the air filter of an internal combustion engine, a rotary tube connection comprising in combination:
    a first tube end portion of injection-molded plastic material, having a substantially cylindrical female bearing portion;
    a second tube end portion having a substantially cylindrical male bearing portion cooperating with said female bearing portion so as to be rotatably guided therein;
    an annular groove in the male bearing portion of said first tube end portion, and at least two radially aligned wall openings in the female bearing portion of said second tube end portion, said wall openings being oblong in shape, having parallel sides in alignment with said annular groove;
    connecting blocks engaged in the radial wall openings of the female bearing portion, said blocks having parallel axial faces snugly engaging the sides of the wall openings as well as said annular groove in the male bearing portion, thereby axially retaining said second tube end portion inside said first tube end portion, while allowing them to rotate relative to one another;
    a pair of retaining noses on each connecting block at its angularly spaced ends, said noses cooperating with the associated wall opening of the female bearing portion in such a way that the block can be inserted and snapped into position from the outside, being thereafter retained in position by the retaining noses;
    at least one peripheral, radially open positioning notch arranged on one of the two tube end portions, said notch having two substantially parallel radially extending locking flanks; and
    a positioning lever fixedly attached by one of its extremities to the other tube end portion, said lever having a resiliently bendable lever portion extending axially toward said positioning notch, with a bias in the direction of engagement with said notch, said lever portion having two substantially parallel opposite locking faces engageable with the locking flanks of said notch, such engagement providing a rotational locking action between the tube end portions; the positioning lever being bendable, against said bias, out of engagement with said notch.

* * * * *